3,340,317
ISOMERIZATION OF CYCLODIOLEFINS
Joseph R. Kenton, Bartlesville, Okla., assignor to Phillips Petroleum Company, a corporation of Delaware
No Drawing. Filed Mar. 17, 1966, Ser. No. 535,009
7 Claims. (Cl. 260—666)

This invention relates to the preparation of conjugated cyclic diolefins from non-conjugated cyclic diolefins. In accordance with one aspect, this invention relates to a process for the conversion of non-conjugated vinylcyclohexenes or ethylidenecyclohexenes to a conjugated cyclodiolefin by contacting with a catalyst comprising magnesium oxide. In accordance with a further aspect, this invention relates to a process for converting 4-vinylcyclohexene or 4-ethylidenecyclohexene or mixtures of these compounds to 3-ethylidenecyclohexene in the presence of an activated magnesium oxide catalyst.

The prior art discloses that vinylcyclohexenes such as 4-vinylcyclohexene can readily be prepared from butadiene by a Diels-Alder type of reaction. It is known in the art that 4-vinylcyclohexene can be converted to a conjugated cyclic diolefin by contacting with a high surface sodium on alumina catalyst, as disclosed in U.S. Patent 3,080,432, Sterling E. Voltz et al. The present invention provides a novel process for converting non-conjugated vinylcyclohexenes and ethylidenecyclohexenes to an isomeric conjugated diolefin product in high yields and with little, if any, by-product such as ethylbenzene. Thus, the present invention is exceedingly attractive from a commercial standpoint in view of the high selectivity obtained in converting the non-conjugated vinylcyclohexene to a high percentage of the desired conjugated cyclic diolefin.

Accordingly, it is an object of this invention to provide an improved process for the conversion or isomerization of cyclodiolefins.

Another object of this invention is to provide a greatly improved isomerization catalyst.

A further object of this invention is to provide a process whereby a high yield of conjugated cyclic diolefin is obtained and in the substantial absence of by-products which are not desired.

Other aspects, objects, as well as the several advantages of this invention, will be apparent to those skilled in the art from a study of this specification and the appended claims.

According to the invention, I have discovered that the isomerization of cyclic diolefins is very effectively catalyzed by adsorbent contact masses comprising magnesia. While the process of this invention is operative over a relatively wide range of conditions, it is of particular value when employed with substantially completely dehydrated catalyst masses.

Thus, according to the invention, a non-conjugated cycloolefin such as vinylcyclohexene and/or ethylidenecyclohexene, which can have the vinyl group in either the 3- or 4-position and the ethylidene group in the 4-position, is contacted with a catalyst comprising magnesium oxide, which has been activated by heating below the sintering temperature of the catalyst, under conditions to effect substantial conversion of the vinylcycloolefin and/or ethylidenecycloolefin.

In accordance with one specific embodiment of the invention, I provide a novel process for converting 4-vinylcyclohexene or 3-vinylcyclohexene or 4-ethylidenecyclohexene or mixtures thereof to 3-ethylidenecyclohexene, which is an isomeric conjugated diolefin product which has one of the double bonds in the 6 carbon atom ring and one associated with the side chain.

As used herein, the term cycloolefin includes unsubstituted vinylcycloolefins and ethylidenecycloolefins as well as alkyl-substituted derivatives thereof wherein the alkyl groups contain 1–3 carbon atoms and wherein the alkyl substituents are in ring positions not involved in the reaction.

Representative examples of cycloolefins that can be isomerized according to the invention include: 3-vinyl-4,4-dimethylcyclohexene, 4-vinyl-3,6,6-triethylcyclohexene, 4-vinylcyclohexene, 3-vinylcyclohexene, 4-ethylidenecyclohexene, 4-ethylidene-5-methyl-6-isopropylcyclohexene.

In accordance with the present invention, the catalytic material, comprising magnesium oxide or a magnesium compound convertible to magnesium oxide when heated to an elevated temperature, is activated as described hereinafter before use as a conversion catalyst. The activation comprises converting magnesium compounds other than magnesium oxide to magnesium oxide, and substantial removal of water, carbon dioxide and free oxygen from the catalyst. The anhydrous magnesium oxide resulting from the activation is an extremely active catalyst for promotion of the isomerization of non-conjugated cyclic diolefin to conjungated cyclic diolefin.

The catalyst of the invention can be prepared by heating magnesium oxide or a magnesium compound convertible to magnesium oxide to a temperature of at least 800° F., preferably at a temperature of 900 to 1100° F., but at a temperature below the sintering temperature of about 1200° F. of the catalyst. During the activation of the catalyst by heating, the catalyst is maintained under inert conditions by carrying out the activation in the presence of nitrogen or other inert gas or in the presence of a light hydrocarbon which is dry to protect the catalyst from moisture. Heating of the catalyst is ordinarily carried out for a period of time ranging from about 1 to 5 hours.

The catalytic material of the invention can be associated with a support material such as diatomaceous earth, silica gel, silica, and the like, when desired. The amount of magnesium ovide present when supported will range from 10–90 percent by weight of the total catalyst, the remainder being support material. A suitable method of preparing the supported catalyst is to dry mix the ingredients before activation. The support material can be in any suitable form such as pellets, powder, and the like.

Magnesium compounds convertible to magnesium oxide when heated at an elevated temperature as defined that can be employed according to the invention include: magnesium carbonate, magnesium bicarbonate, magnesium nitrate, magnesium hydroxide, magnesium oxalate, magnesium acetate, and the like.

The process of the invention can be conducted in batch fashion or continuously by passing a stream of the vinylcycloolefin and/or ethylidenecycloolefin charge through a bed of the magnesium oxide catalyst. In either case, the temperature of operation will vary from room temperature, to the boiling temperature of the starting material at atmospheric pressure. Ordinarily, the contacting will be carried out at a temperature in the range of 0° F. to about 350° F., preferably 60–300° F. The reaction can be carried out in the presence of a diluent which does not react under isomerizing conditions such as paraffins, cycloparaffins, and the like.

The process of the invention can be carried out continuously by charging the vinylcycloolefin and/or ethylidenecycloolefin containing feed at reflux temperature into a reactor containing the activated catalyst, removing the effluent from the reactor and flashing the lower boiling cycloolefin feed to an overhead recycle stream. The kettle product containing the desired conjugated cyclic diolefin product can then be subjected to further purification if desired.

The conjugated cyclic diolefin product of the present process can be polymerized by means of an organometal catalyst system to form solid polymers or copolymers. For example, 3-ethylidenecyclohexene, a conjugated cyclic diolefin product of the invention, can be reacted in an inert diluent utilizing a titanium tetrachloride and aluminum triethyl catalyst to form a solid polymer.

*Example I*

7.8 g. activated 1/8 inch pellets MgO was charged to a flask which had been flushed with nitrogen. 55.0 g. of pure grade 4-vinylcyclohexene was added to the flask. The flask was heated under reflux for a total of 3¾ hours. Initially the temperature was 260° F., but after 2 hours the temperature had risen to 285° F., which was maintained until the end of the reaction time.

Samples were taken after 2 hours for GLC[1] analysis and at th end of the run. The composition of the mixture was as follows:

|  | After 2 hours, wt. percent | After 3¾ hours, wt. percent |
|---|---|---|
| Vinylcyclohexenes | 27.44 | 15.85 |
| 4-ethylidenecyclohexene | 1.17 | 0.78 |
| 3-ethylidenecyclohexene | 58.9 | 67.60 |
| Unidentified | 5.59 | 4.97 |
| Ethyl benzene | 6.25 | 9.82 |
| Total | 99.35 | 99.02 |

*Example II*

About 10 g. MgO was charged into a nitrogen flushed bottle and 75 ml. of 4-vinylcyclohexene (pure grade) was added. This was allowed to stand at room temperature for about 6 hours. At the end of that period, the analysis showed a 6.6 percent conversion to 3-ethylidenecyclohexene, no 4-ethylidenecyclohexene and only 0.017 weight percent of ethylbenzene. The activity of the catalyst at room temperature was clearly demonstrated.

*Example III*

10 g. activated MgO was introduced into a ¾ inch diameter ion exchange tube and 40 ml. of 4-ethylidenecyclohexene was allowed to percolate through the column. The contact resulted in an exothermic reaction and 85 percent of the starting material was converted to the 3-ethylidenecyclohexene.

It will be observed from the preceding examples that a high yield of the desired 3-ethylidenecyclohexene was obtained and that the amount of by-product ethylbenzene produced was quite low. Thus, it can be seen that the present invention is exceedingly attractive for commercial operation.

Reasonable variation and modification are possible within the scope of the foregoing disclosure and the appended claims to the invention, the essence of which is that non-conjugated vinylcycloolefins and/or ethylidenecycloolefins are converted in high yield to conjugated cyclic diolefins in the presence of an activated magnesium oxide catalyst.

I claim:

1. A process for preparing a conjugated cyclic diolefin which comprises contacting a non-conjugated cycloolefin selected from 3-vinyl-4,4-dimethylcyclohexene, 4-vinyl-3,6,6-triethylcyclohexene, 4 - vinylcyclohexene, 3 - vinylcyclohexene, 4 - ethylidenecyclohexene, 4 - ethylidene - 5-methyl-6-isopropylcyclohexene with a catalyst consisting essentially of magnesium oxide, activated by heating below the sintering temperature, under isomerization conditions of temperature and pressure sufficient to effect substantial conversion of said non-conjugated cycloolefin to conjugated cyclic diolefin.

2. A process according to claim 1 wherein said non-conjugated cycloolefin is 4-vinylcyclohexene and said conjugated cyclic diolefin is 3-ethylidenecyclohexene.

3. A process according to claim 1 wherein said non-conjugated cycloolefin is 4-ethylidenecyclohexene and said conjugated cyclic diolefin is 3-ethylidenecyclohexene.

4. A process according to claim 1 wherein the temperature during contacting ranges from room temperature to about the boiling temperature of the starting material at 1 atmosphere pressure.

5. A process according to claim 4 wherein said temperature ranges from 0° F. to about 350° F.

6. A process according to claim 1 wherein said catalyst consists essentially of magnesium oxide activated by heating a magnesium compound which yields magnesium oxide to a temperature of from 800–1100° F. for 1 to 5 hours under such conditions as to remove water, $CO_2$ and free oxygen therefrom and leave a residue of catalytically active magnesium oxide.

7. A process according to claim 1 wherein the feed for contacting comprises a mixture of non-conjugated cyclohexenes containing as two components 4-vinylcyclohexene and 4-ethylidenecyclohexene.

References Cited

UNITED STATES PATENTS

| 2,361,613 | 10/1944 | Drennan | 260—683.2 |
| 2,403,672 | 7/1946 | Matuszak | 260—683.2 |
| 2,804,489 | 8/1957 | Pines | 260—683.2 |
| 2,965,689 | 12/1960 | Roebuck et al. | 260—683.53 |
| 3,080,432 | 3/1963 | Voltz et al. | 260—666 |
| 3,146,278 | 8/1964 | Habeshaw et al. | 260—683.2 |
| 3,201,493 | 8/1965 | Meisinger et al. | 260—683.2 |
| 3,204,009 | 8/1965 | Keith | 260—683.2 |

DELBERT E. GANTZ, *Primary Examiner.*

V. O'KEEFE, *Assistant Examiner.*

---

[1] Gas liquid chromatography.